(12) United States Patent
Wright et al.

(10) Patent No.: US 8,135,906 B2
(45) Date of Patent: Mar. 13, 2012

(54) ONLINE STORAGE CAPACITY EXPANSION OF A RAID STORAGE SYSTEM

(75) Inventors: Robin F. Wright, Colorado Springs, CO (US); Scott W. Dominguez, Colorado Springs, CO (US); Jason B. Schilling, Colorado Springs, CO (US); Cirila M. Montano, Colorado Springs, CO (US); Brian Worby, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 456 days.

(21) Appl. No.: 12/120,889

(22) Filed: May 15, 2008
(Under 37 CFR 1.47)

(65) Prior Publication Data
US 2009/0287880 A1  Nov. 19, 2009

(51) Int. Cl.
*G06F 12/00* (2006.01)
(52) U.S. Cl. ............ 711/114; 711/4; 711/112; 711/113; 711/161; 711/162; 711/170; 711/172; 714/6.1; 714/6.22
(58) Field of Classification Search ...... 711/4, 112–114, 711/161–162, 170, 172; 714/6.1, 6.22
See application file for complete search history.

(56) References Cited

U.S. PATENT DOCUMENTS

| | | | |
|---|---|---|---|
| 5,875,457 A * | 2/1999 | Shalit | 711/114 |
| 6,223,252 B1 * | 4/2001 | Bandera et al. | 711/114 |
| 6,530,004 B1 * | 3/2003 | King et al. | 711/165 |
| 7,082,498 B2 * | 7/2006 | Chatterjee et al. | 711/114 |
| 7,111,117 B2 * | 9/2006 | Franklin et al. | 711/114 |
| 7,111,147 B1 * | 9/2006 | Strange et al. | 711/209 |
| 7,120,826 B2 * | 10/2006 | Fore et al. | 714/7 |
| 7,249,278 B2 * | 7/2007 | Fukuda | 714/7 |
| 7,454,566 B1 * | 11/2008 | Overby | 711/114 |
| 2003/0105931 A1 * | 6/2003 | Weber et al. | 711/162 |

OTHER PUBLICATIONS

Charles M. Kozierok, "The PC Guide: RAID Level 1", Site Version: 2.2.0, Apr. 17, 2001. Retrieved on Oct. 4, 2010 from <http://www.pcguide.com/ref/hdd/perf/raid/levels/singleLevel1-c.html>.*

* cited by examiner

*Primary Examiner* — Arpan P. Savla
(74) *Attorney, Agent, or Firm* — Duft Bornsen & Fishman LLP

(57) ABSTRACT

The methods and structure herein provide for expanding the storage capacity of a RAID storage system while maintaining the same level of RAID storage management. A RAID storage controller may be coupled between a host computer and a RAID storage volume. The RAID storage controller manages the disk drives of the storage volume to present a single logical volume of storage to the host computer. When a storage expansion is desired, the RAID storage controller may communicatively couple to at least one expansion disk drive and begin transfer of data from the original RAID storage volume to the expansion disk drive(s). During this data transfer, read and write operations are continued to the original RAID storage volume. Additionally, the RAID storage controller duplicates write operations to the expansion disk drive(s) such that general storage operations required by the host computer are continued.

19 Claims, 4 Drawing Sheets

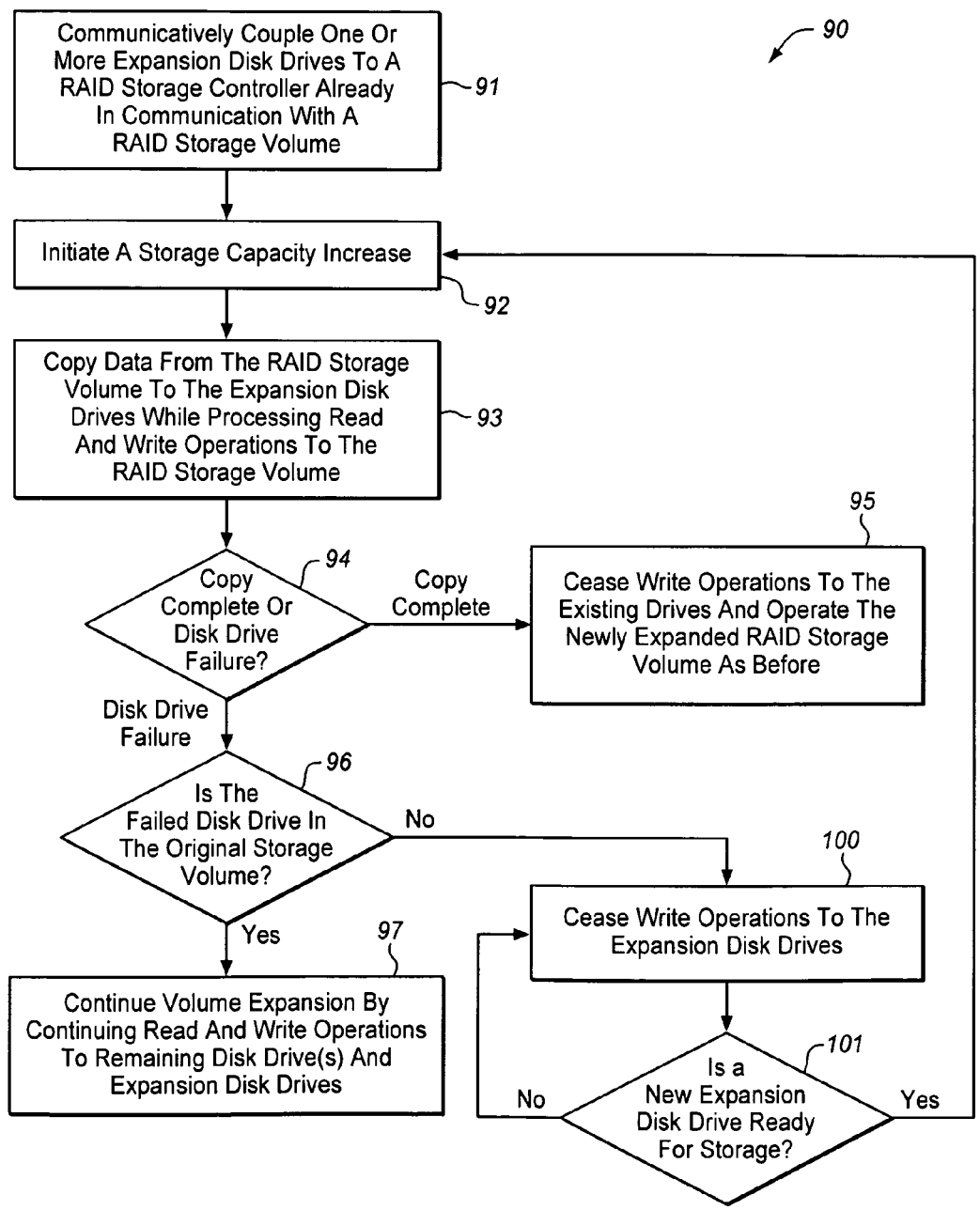

ONLINE STORAGE CAPACITY EXPANSION OF A RAID STORAGE SYSTEM

BACKGROUND

1. Field of the Invention

Generally, the invention relates to increasing the storage capacity of a RAID (Redundant Array of Independent Disks) storage system. More specifically, the invention relates to transferring data from a RAID storage volume to one or more disk drives of increased storage capacity while maintaining typical RAID storage operations.

2. Discussion of the Related Art

Storage systems typically incorporate local storage controller features within the storage system and a plurality of storage devices such as disk drives for storing significant volumes of user data. User data is generally communicated from attached host systems (e.g., host computers) through read and write I/O requests processed by the storage controller. The requests record (write) or retrieve (read) data on the storage devices of the storage subsystem. Frequently, the storage devices in such storage subsystems are magnetic disk drives. A local disk controller is typically incorporated within each such disk drive and is adapted to control low level operations of the disk drive itself—operations such as controllably rotating the magnetic storage medium, controllably actuating control mechanisms to position a read/write head assembly and read/write channel electronics to record information on the disk drive storage medium or to retrieve information from the magnetic storage medium.

In many storage applications, reliability of the stored data is critical. Once the data is communicated from a host system, the host system and applications may rely on the storage subsystem to properly and persistently record the supplied data on the magnetic storage media of the disk drive. Numerous techniques are known in the art to assure such reliability. One example of such includes RAID storage systems.

In RAID storage systems, stored data is combined with redundancy information to permit continued operation of the system despite failure of any single disk drive. Generally, RAID storage systems combine two or more physical disk drives into a single logical unit (e.g., a RAID storage volume) by using either special hardware or software. Hardware solutions are often designed to present the disk drives of the logical unit to the host computer as a single disk drive in a manner that is transparent to the operating system of a host computer. Software solutions, on the other hand, are typically implemented in the operating system of the host computer itself, and again would present the RAID disk drives as a single disk drive to the host computer.

Various RAID levels exist and generally employ one or more of three key concepts: "mirroring"—the copying of data to more than one disk drive; "striping"—the splitting of data across more than one disk drive; and "error correction"—the storage of redundant data to detect data errors and correct them via the redundant data. Different RAID levels use one or more of these techniques, depending on the system requirements. For example, in RAID "level 1" storage management, data is mirrored. In this regard, a disk drive has its data duplicated on another disk drive via a RAID controller (i.e., configured as either hardware or software). If either disk drive fails, the other disk drive continues to function as a single disk drive until the failed disk drive is replaced. RAID level 1 is fairly popular among lower storage capacity organizations that still require some degree of fault tolerance (e.g., small offices).

A problem exists when RAID level 1 users require additional storage capacity but do not wish to upgrade to an "enterprise-type" storage system solution. For example, a relatively small office may increase its business activities and therefore require more storage capacity. However, the redundancy offered by the RAID level 1 storage system may still be all that is required to ensure that data can be recovered in case of failure. Currently, in order to expand the storage capacity of a RAID level 1 storage volume, a new storage volume is created using separate disk drives and the data is manually copied from the existing storage volume to the new storage volume. To prevent data corruption, the existing storage volume is generally removed from storage operations (i.e., "taken off-line"). Accordingly, write operations from the host computer(s) are prevented from changing existing data until it is transferred (i.e., "backed up") to the new larger capacity storage volume. Upon completion of the data transfer to the new storage volume, the user gains increased storage capacity and typical storage operations (e.g., read and write operations) to the new storage volume resume. However, the downtime associated with the data backup to the new storage volume may be troublesome, particularly to organizations requiring full-time storage operations.

It is evident from the above discussions that there is a need for expanding storage volume capacity while maintaining storage operations, particularly among storage volumes of the same RAID level.

SUMMARY

The present invention solves the above and other problems, thereby advancing the state of the useful arts, by providing methods and structure for expanding the storage capacity of a RAID storage system without the volume being taken off-line while maintaining the same level of RAID storage management. In this regard, a RAID storage controller may be coupled between a host computer and a RAID storage volume that includes a plurality of disk drives. The RAID storage controller, by way of components thereof, manages the disk drives to present a single logical volume of storage to the host computer. When a storage expansion is desired, the RAID storage controller may communicatively couple to one or more expansion disk drives and begin transfer of data from the RAID storage volume to the expansion disk drive(s). During this data transfer, read and write operations are continued to the original RAID storage volume. Additionally, the RAID storage controller enables write operations to the expansion disk drive(s) such that general storage operations required by the host computer are continued. Certain other aspects and features of the invention are further detailed hereinbelow.

One aspect of the invention regards a RAID storage controller that interfaces with a host computer and a RAID storage volume. The RAID storage controller comprises a disk drive management module adapted to configure the RAID storage volume from a first plurality of disk drives and control read and write operations requested by the host computer. The RAID storage controller also includes a storage capacity management module adapted to increase storage capacity via a transfer of data from the RAID storage volume to at least one expansion disk drive that comprises a storage capacity greater than at least one disk drive of the RAID storage volume. The RAID storage volume comprises the same RAID level (e.g., RAID level 1) after transfer of the data to the at least one expansion disk drive. The transfer of the data from the RAID storage volume to the at least one expansion disk drive occurs while read and write operations to the RAID storage volume are allowed to continue.

Another aspect of the invention regards a method of expanding storage capacity in a RAID storage system having a RAID storage controller and having a first plurality of disk drives configured as a RAID storage volume. The RAID storage controller is in communication with the RAID storage volume. The method includes communicatively coupling at least one expansion disk drive to the RAID storage controller and initiating a storage capacity management module in response to communicatively coupling the at least one expansion disk drive to the RAID storage controller. The method also includes copying data from the RAID storage volume, via the storage capacity management module, to the at least one expansion disk drive. The method further includes, while copying the data from the RAID storage volume to the at least one expansion disk drive, performing read and write operations to the original disk drives of the RAID storage volume.

BRIEF DESCRIPTION OF THE DRAWINGS

FIG. 4 is a flow chart of an exemplary process for expanding storage capacity within a RAID storage system.

DETAILED DESCRIPTION OF THE DRAWINGS

Figure 1:
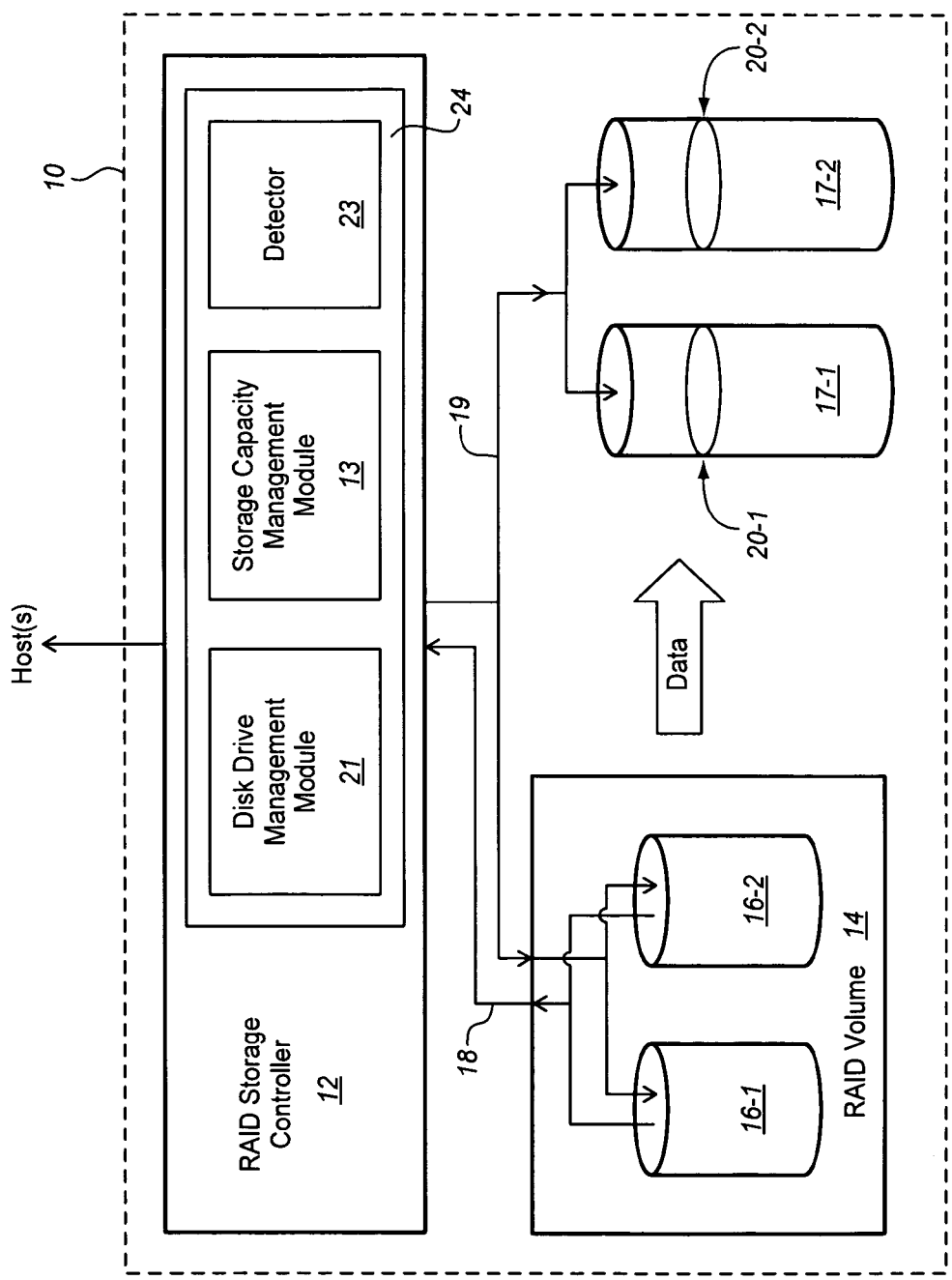
FIG. 1 is a block diagram of an exemplary RAID storage system capable of expanding storage capacity during storage operations.

FIG. 1 is a block diagram of an exemplary RAID storage system 10 capable of expanding storage capacity during storage operations. More specifically, certain aspects and features of the RAID storage system 10 presented herein enable the RAID storage system to increase storage capacity by transferring data as it presently exists with the RAID storage volume 14 to one or more larger storage capacity expansion disk drives 17. During the transfer of this data from the RAID storage volume 14 to the expansion disk drives 17, write operations 19 from the host to the RAID storage volume 14 continues so as to provide uninterrupted storage operations from the perspective of a host computer.

As is common to a RAID storage system, the RAID storage system 10 includes a RAID storage volume 14 which comprises the disk drives 16-1 and 16-2 managed by the RAID storage controller 12 as a single logical storage unit. In this regard, a host computer "views" the disk drives 16-1 and 16-2 of the RAID storage volume 14 as a single logical volume and therefore reads and writes to the RAID storage volume 14 as though it were reading and writing to a single logical volume.

To manage the disk drives 16-1 and 16-2 of the RAID storage volume 14 and operate them as a single logical unit, the RAID storage controller 12 is configured with a disk drive management module 21. Generally, the disk drive management module 21 is configured as a firmware module that is resident with a computer memory 24 configured with the RAID storage controller 12. The software instructions of the firmware module direct the RAID storage controller 12 to manage the RAID storage volume 14 according to a particular RAID level. For example, the RAID storage controller 12 may implement a RAID level 1 storage management technique that causes existing data on a first disk drive of the RAID storage volume 14 to be duplicated onto a second disk drive of the RAID storage volume 14. That is, the data stored with the disk drive 16-1 may be duplicated, or "mirrored", onto the disk drive 16-2 within the RAID storage volume 14. Once the data of the disk drive 16-1 is mirrored onto the disk drive 16-2, data is no longer copied from one disk drive to another during storage operations.

The RAID storage volume 14 is not intended to be limited, however, to simply the two disk drives 16-1 and 16-2. Rather, the RAID storage volume 14 may include any integer number of disk drives 16-1 and 16-2 that is suitable for providing RAID storage management. For example, to provide RAID level 1 storage management, the RAID storage volume 14 may be configured with any even number of disk drives 16-1 and 16-2 such that the disk drives 16-1 and 16-2 may be paired for mirroring of one disk drive to another disk drive. Alternatively, RAID level 1 storage management may have the RAID storage volume 14 configured with multiple disk drives mirroring a single disk drive. Other RAID levels of storage management (e.g., RAID levels 0, 2 through 6 and 10) may also use more than two computer disk drives 16-1 and 16-2.

As discussed hereinabove, a problem exists when the RAID storage system 10 increases its storage capacity. Previously, a new RAID storage expansion volume, one with larger storage capacity, would be introduced to the RAID storage system 10 and the data from the RAID storage volume 14 would be copied onto the RAID storage expansion volume. However, storage operations of the RAID storage system 10 would be taken off-line during the copy process. In accordance with the inventive aspects of features described herein, the RAID storage controller 12 is also configured with a storage capacity management module 13 that is generally configured as firmware resident within the computer memory 24. The storage capacity management module 13 couples one or more expansion disk drives 17 to the RAID storage controller 12 such that the data from the RAID storage volume 14 may be copied onto the expansion disk drives 17 while continuing processing of read and write operations required by the host computer. That is, the expansion disk drives 17-1 and 17-2 are as large or larger storage capacity disk drives that are capable of storing all of the data of the disk drives 16-1 and 16-2 of the RAID storage volume 14 (e.g., the data levels 20-1 and 20-2 of the of the disk drives 17-1 and 17-2). Once this copying process begins, the storage capacity management module 13 also duplicates write operations 19 to the disk drives 17-1 and 17-2 such that newly created data of the storage volume 14 need not be re-created. Read operations (i.e., read requests from the host computer 11) are generally continued during the copying process via the read requests 18 to the disk drives 16-1 and 16-2 of the RAID storage volume 14.

Generally, the storage capacity management module 13 is configured for performing the actual copying process by buffering data from the storage volume 14 for transfer to the expansion disk drives 17. That is, the storage capacity management module 13 may retrieve data from the RAID storage volume 14 and transfer the data to the expansion disk drives 17 for storage therewith. Certain RAID storage controllers may, however, be configured with limited amounts of computer memory that make buffering more challenging and therefore in the case of large amounts of data, more time-consuming. In this regard, the storage capacity management module 13 may be configured for performing "disk to disk" Remote Direct Memory Accesses (RDMA) that allows data to move directly from one disk drive into that of another with limited buffering by the controller 12.

Also configured with the RAID storage controller 12 is a detector 23. The detector is also generally configured as a firmware module with the computer memory 24. The detector monitors the operational status of the disk drives (e.g., the disk drives 16-1 and 16-2 and 17-1 and 17-2) that are communicatively coupled to the RAID storage controller 12. In this regard, the detector 23 may determine when a disk drive fails so that the storage capacity management module 13 may alter the copying process of the data from the RAID storage volume 14 to the expansion disk drives 17. To illustrate, if the detector 23 detects a failure of a disk drive 16-2 of the RAID storage volume 14 during the transfer of data from the storage volume 14 to the expansion disk drives 17, the detector may indicate such to the storage capacity management module 13. The storage capacity management module 13 may, in turn, configure the disk drive 17-1 as a "hot spare" (e.g., a readily replaceable disk drive) for the failed drive within the RAID storage volume 14. This example and others are further illustrated in FIGS. 2 and 3.

Although shown and described with respect to essentially replacing the disk drives 16-1 and 16-2 of the RAID storage volume 14 with the disk drives 17-1 and 17-2, the invention is not intended to be so limited. Other manners of disk replacement with higher capacity storage may be implemented to increase the overall storage capacity of the RAID storage system 10. For example, in an embodiment where the disk drives 16-1 and 16-2 have different storage capacities, the lower storage capacity disk drives 16-1 and 16-2 may be phased out by transferring data from the lower capacity storage disk drive to the larger capacity storage disk drive, as may be presently done in a RAID level 1 storage management. From there, the data may be transferred to a single disk drive (e.g., the disk drive 17-1). Again, during this data transfer, write operations would continue to the RAID storage volume 14 as well as the disk drive 17.

Figure 2:
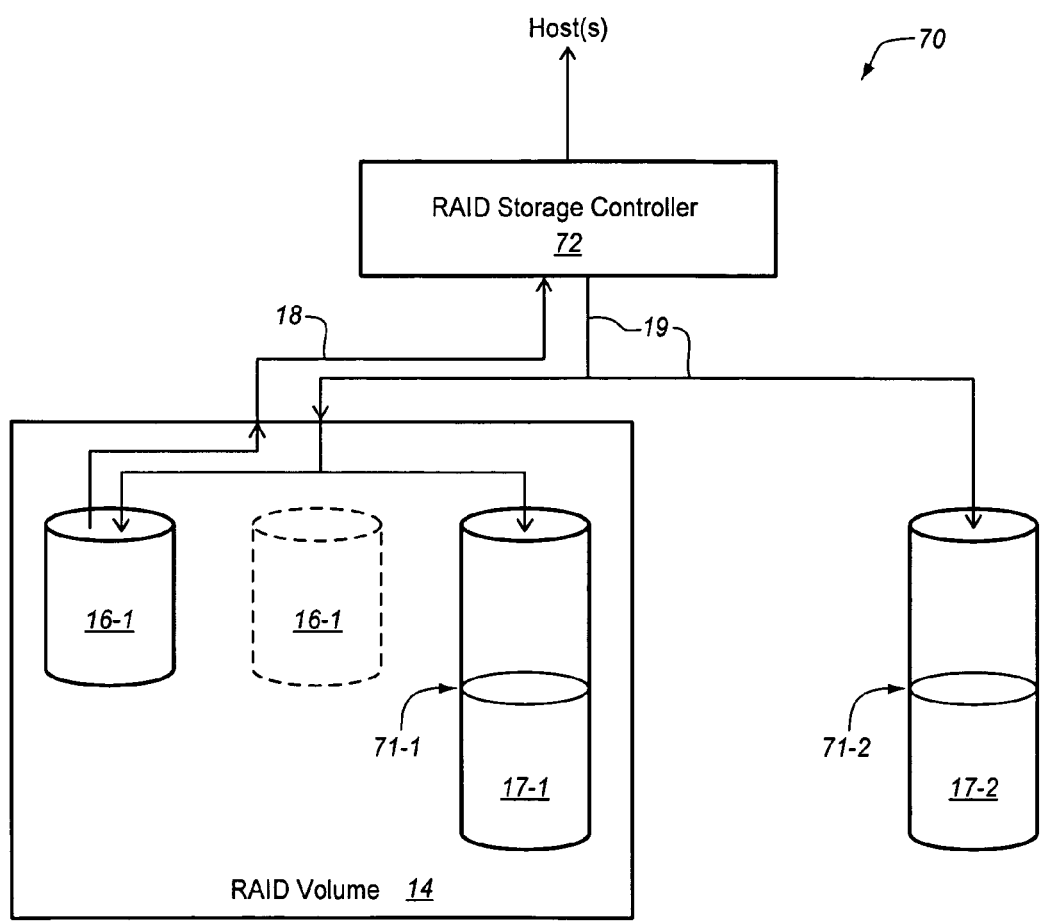
FIG. 2 is a block diagram of an exemplary RAID storage controller interacting with a RAID storage volume during an exemplary failure of the RAID storage volume expansion.

An example of a change to a storage capacity expansion is illustrated with the RAID storage system 70 of FIG. 2. In this regard, FIG. 2 is a block diagram of a general RAID storage controller 72 interacting with the RAID storage volume 14 and the expansion disk drives 17 during a failure event. In this example, a failure is detected by a suitable detector of the controller 72 in the disk drive 16-2 during the expansion process in which the disk drives 17-1 and 17-2 are being used to expand the storage capacity of the RAID storage system 70. The RAID storage controller 72, upon detection of a failure event, ceases read and write operations to the failed disk drive 16-2 (illustrated by a dashed line). Thereafter, the data continues to be copied from disk drives 16-1 to 17-1 and 17-2, while continuing host reads from disk drive 16-1 and host writes to disk drives 16-1, 17-1 and 17-2. Once the expansion process is complete, the disk drives 16-1 and 16-2 may then be removed from service (e.g., decoupled from read and write operations via the RAID storage controller 72) and the read and write operations continue to the newly expanded RAID storage volume 14.

Although shown and described with respect to a failover of data from the RAID storage volume 14 to a configured spare from the expansion disk drive(s) 17, the invention is not intended to be so limited. For example, a similar copy process may be used when the RAID storage volume 14 is configured with disk drives 16-1 and 16-2 having different storage capacities. In this regard, an expansion disk drive 17 may be used to replace a lower capacity disk dive 16 by "failing over" the data from the lower capacity disk drive(s) 16 to the expansion disk drive(s) 17. Thereafter, read and write operations may continue to the storage volume 14.

Alternatively, if a disk failure occurs to one of the disk drives 16-1 and 16-2 during the expansion process, the RAID storage volume 14 may be degraded such that the capacity expansion continues without the need for a failover. Such may result in a faster means to implementing the expansion process and returning the RAID storage volume 14 to normal operations.

Figure 3:
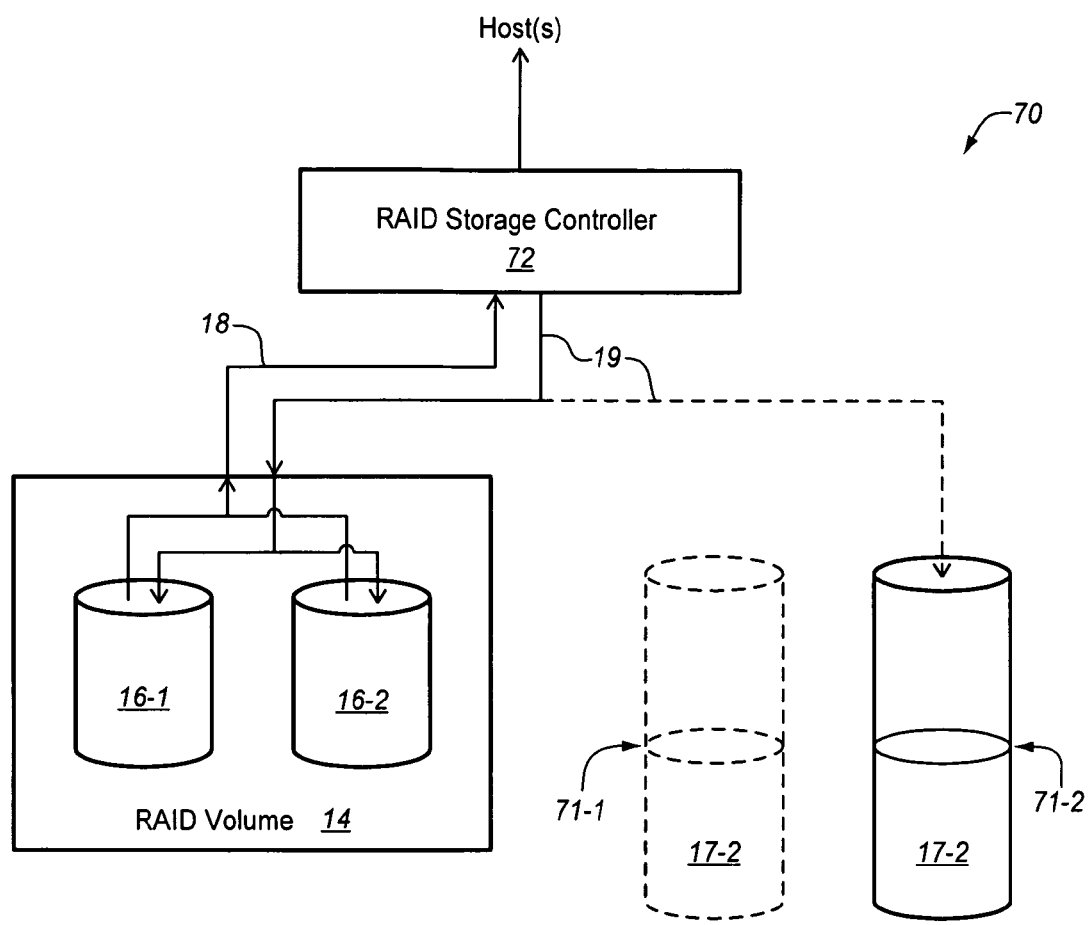
FIG. 3 is a block diagram of the RAID storage controller of FIG. 2 interacting with the RAID storage volume during another exemplary failure of the RAID storage volume expansion.

FIG. 3 illustrates a block diagram of a RAID storage controller 72 interacting with the RAID storage volume 14 during another exemplary failure event. In this example, a failure is detected in the disk drive 17-1 (e.g., illustrated by a dashed line). In such an event, the RAID storage controller 72 ceases the write operations 19 to the expansion disk drives 17-1 and 17-2 until the failed disk drive 17-1 can be replaced. In the meantime, however, read and write operations 18 and 19 may continue to the RAID storage volume 14.

FIG. 4 is a flow chart of an exemplary process 90 for expanding storage capacity within a RAID storage system, as generally described hereinabove. The storage capacity expansion process 90 begins when one or more expansion disk drives are communicatively coupled to a RAID storage controller that is already in communication with a RAID storage volume, in the process element 91. Once the RAID storage controller is in communication with the expansion disk drives, the RAID storage controller may initiate a storage capacity increase, in the process element 92. Thereafter, data is copied from the RAID storage volume to the expansion disk drives, in the process element 93. During this time, read and write operations to the original RAID storage volume are continued by the RAID storage controller. Additionally, write operations to the expansion disk drives are also processed such that newly created data in the existing storage volume does not need to be re-created during the storage capacity expansion process.

Generally, storage capacity expansion of the RAID storage system is continued until the data from the original RAID storage is completely transferred to the expansion disk drives. Once the copy is complete, read and write operations to the existing disk drives of the storage volume are terminated and the newly expanded storage volume is operated as normal, in the process element 95. However, if a disk drive failure is detected, in the process element 94, the RAID storage controller may alter the storage capacity expansion depending on where the disk drive failure occurred. In this regard, the RAID storage controller may determine whether the failed disk drive is in the original storage volume or whether the failed disk drive is in the expansion disk drives, in the process element 96. If the failed disk drive is in the original RAID storage volume, the RAID storage controller may continue read and write operations to the remaining disk drive(s) in the original RAID storage volume and the expansion disk drives, in the process element 97.

If the failed disk drive, however, is one or more of the expansion disk drives, the RAID storage controller may cease write operations to the expansion disk drives, in the process element 100, at least until the failed disk drive can be replaced with an operable disk drive. In this regard, the RAID storage controller may determine whether an operable expansion disk drive is ready for storage, in the process element 101. Once an operable disk drive is configured with the expansion disk drives, the storage expansion may be reinitiated such that data may be again be copied from the disk drives of the original RAID storage volume to the expansion disk drives.

Although shown and described with respect to a general RAID storage controller, those skilled in the art should readily recognize that RAID storage controllers and their components may be implemented in hardware, software, and combinations thereof. Accordingly, the invention is not intended to be limited to a particular RAID storage controller implementation. Moreover, while the embodiments shown herein exemplify capacity expansion for RAID level 1 storage volumes, the invention is not intended to be so limited. Those skilled in the art should readily recognize that other RAID level storage volumes may be similarly expanded. For example, a RAID level 5 storage volume having a plurality of disk drives having data striped across the disk drives may be, in essence, "mirrored" onto a corresponding number of expansion disk drives while write operations continue to the storage volume as well as the expansion disk drives. Afterwards, the lower capacity disk drives of the RAID level 5 storage volume may be disengaged such that the volume may operate with the larger capacity disk drives.

Moreover, the embodiments shown and described above are generally directed to computer disk drives. However, the invention is not intended to be so limited. Rather, other types of storage devices may be used to employ RAID storage and the novel aspects of RAID storage expansion as described herein. For example, those skilled in art should readily recognize that the invention could be implemented with solid-state drives, such as flash memory drives.

While the invention has been illustrated and described in the drawings and foregoing description, such illustration and description is to be considered as exemplary and not restrictive in character. Protection is desired for all changes and modifications that come within the scope and spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A Redundant Array of Independent Disks (RAID) storage controller that interfaces with a host computer and a RAID storage volume, the RAID storage controller comprising:
    a disk drive management module that configures the RAID storage volume from a first plurality of disk drives and that controls read and write operations requested by the host computer; and
    a storage capacity management module that increases storage capacity via a transfer of data from the RAID storage volume to at least one expansion disk drive that comprises a storage capacity greater than at least one disk drive of the RAID storage volume, wherein the RAID storage volume comprises the same RAID level after transfer of the data to the at least one expansion disk drive, wherein the transfer of the data from the RAID storage volume to the at least one expansion disk drive occurs during the read and write operations to the RAID storage volume, wherein the transfer of the data from the RAID storage volume comprises duplicating incoming write operations such that they are forwarded to the plurality of disk drives and forwarded to the at least one expansion disk drive, and wherein the storage capacity management module detects a failure of at least one of the first plurality of disk drives during the transfer of data, wherein the storage capacity management module continues host read operations to the remaining disk drives of the first plurality of disk drives responsive to detecting the failure, wherein the storage capacity management module continues duplicating incoming write operations such that they are forwarded to the plurality of disk drives and forwarded to the at least one expansion disk drive responsive to detecting the failure, and wherein the storage capacity management module takes the first plurality of disk drives off-line from read and write operations directed to the RAID storage volume upon completion of the transfer of data.

2. The RAID storage controller of claim 1, wherein the RAID storage volume comprises a RAID level 1 volume.

3. The RAID storage controller of claim 1, further comprising a detector that detects a disk drive failure of the RAID storage volume, wherein the storage capacity management module configures the at least one expansion disk drive as a spare for the RAID storage volume responsive to detection by the detector of the disk drive failure of the RAID storage volume.

4. The RAID storage controller of claim 3, wherein the storage capacity management module performs read and write operations to the configured spare disk drive.

5. The RAID storage controller of claim 1, further comprising a detector that detects a disk drive failure of the at least one expansion disk drive, wherein the storage capacity management module terminates expansion of the storage capacity upon detection of the disk drive failure within the at least one expansion disk drive.

6. The RAID storage controller of claim 1, wherein the storage capacity management module directs the disk drive management module to terminate read and write operations to the RAID storage volume upon transfer of the data from the RAID storage volume to the at least one expansion disk drive.

7. A method of expanding storage capacity in a Redundant Array of Independent Disks (RAID) storage system having a RAID storage controller and having a first plurality of disk drives configured as a RAID storage volume, wherein the RAID storage controller is in communication with the RAID storage volume, the method comprising:
    communicatively coupling at least one expansion disk drive to the RAID storage controller;
    initiating a storage capacity management module in response to communicatively coupling the at least one expansion disk drive to the RAID storage controller;
    copying data from the RAID storage volume, via the storage capacity management module, to the at least one expansion disk drive, wherein the copying comprises performing Remote Direct Memory Access (RDMA) from at least one disk drive of the first plurality of disk drives to the at least one expansion disk drive;
    while copying the data from the RAID storage volume to the at least one expansion disk drive, performing read and write operations to the RAID storage volume;
    detecting a failure of at least one of the first plurality of disk drives during the copying;
    continuing host read operations to the remaining disk drives of the first plurality of disk drives responsive to detecting the failure;
    continuing duplicating incoming write operations such that they are forwarded to the first plurality of disk drives and forwarded to the at least one expansion disk drive responsive to detecting the failure; and
    taking the first plurality of disk drives off-line from read and write operations directed to the RAID storage volume upon completion of the copying data.

8. The method of claim 7, wherein the RAID storage volume comprises a RAID level 1 volume.

9. The method of claim 7, further comprising:
    configuring the at least one expansion disk drive as a spare for the first disk drive within the RAID storage volume in response to said detecting.

10. The method of claim 9, further comprising, in response to said configuring the at least one expansion disk drive as a spare, performing read and write operations to the configured spare disk drive.

11. The method of claim 7, further comprising:
   detecting a failure of the at least one expansion disk drive; and
   disabling said copying data from the RAID storage volume to the at least one expansion disk drive in response to said detecting.

12. The method of claim 7, further comprising disabling said read and write operations to the RAID storage volume after the data from the RAID storage volume has copied to the at least one expansion disk drive.

13. The method of claim 7, performing said write operations to the at least one expansion disk drive while copying the data from the RAID storage volume to the at least one expansion disk drive.

14. A non-transitory computer readable medium for expanding storage capacity in a Redundant Array of Independent Disks (RAID) storage system having a RAID storage controller and having a first plurality of disk drives configured as a RAID storage volume, wherein the RAID storage controller is in communication with the RAID storage volume, the computer readable medium including software instructions that, when executed by a computer processor, direct the computer processor to:
   communicatively couple at least one expansion disk drive to the RAID storage controller;
   initiate a storage capacity management module in response to communicatively coupling the at least one expansion disk drive to the RAID storage controller;
   copy data from the RAID storage volume, via the storage capacity management module, to the at least one expansion disk drive, wherein copying data from the RAID storage volume comprises performing Remote Direct Memory Access (RDMA) from at least one disk drive of the first plurality of disk drives to the at least one expansion disk drive;
   while copying the data from the RAID storage volume to the at least one expansion disk drive, perform read and write operations to the RAID storage volume;
   detecting a failure of at least one of the first plurality of disk drives during the copying;
   continuing host read operations to the remaining disk drives of the first plurality of disk drives responsive to detecting the failure;
   continuing duplicating incoming write operations such that they are forwarded to the first plurality of disk drives and forwarded to the at least one expansion disk drive responsive to detecting the failure; and
   taking the first plurality of disk drives off-line from read and write operations directed to the RAID storage volume upon completion of the copying.

15. The non-transitory computer readable medium of claim 14, wherein the RAID storage volume comprises a RAID level 1 volume.

16. The non-transitory computer readable medium of claim 14, further comprising software instructions that direct the computer processor to:
   configure the at least one expansion disk drive as a spare for the first disk drive within the RAID storage volume in response to detecting the failure of the first disk drive; and
   perform read and write operations to the configured spare disk drive.

17. The non-transitory computer readable medium of claim 14, further comprising software instructions that direct the computer processor to:
   detect a failure of the at least one expansion disk drive; and
   disable copying data from the RAID storage volume to the at least one expansion disk drive in response to detecting the failure of the disk drive of the at least one expansion disk drive.

18. The non-transitory computer readable medium of claim 14, further comprising software instructions that direct the computer processor to:
   disable said read and write operations to the RAID storage volume after the data from the RAID storage volume has copied to the at least one expansion disk drive; and
   perform said write operations to the at least one expansion disk drive while copying the data from the RAID storage volume to the at least one expansion disk drive.

19. A Redundant Array of Independent Disks (RAID) storage controller that interfaces with a host computer and a RAID storage volume, wherein the RAID storage controller configures the RAID storage volume from a first plurality of storage elements and wherein the RAID storage controller controls read and write operations requested by the host computer, the RAID storage controller comprising:
   a storage capacity management module that increases storage capacity via a transfer of data from the RAID storage volume to at least one expansion storage element that comprises a storage capacity greater than at least one storage element of the RAID storage volume, wherein the RAID storage volume comprises the same RAID level after transfer of the data to the at least one expansion storage element, wherein the transfer of the data from the RAID storage volume to the at least one expansion storage element occurs during the read and write operations to the RAID storage volume, and wherein the transfer of the data from the RAID storage volume comprises duplicating incoming write operations such that they are forwarded to the plurality of disk drives and forwarded to the at least one expansion disk drive, wherein the storage capacity management module detects a failure of at least one of the first plurality of storage elements during the transfer of data, wherein the storage capacity management module continues host read operations to the remaining storage elements of the first plurality of storage elements responsive to detecting the failure, wherein the storage capacity management module continues duplicating incoming write operations such that they are forwarded to the plurality of storage elements and forwarded to the at least one expansion storage element responsive to detecting the failure, and wherein the storage capacity management module takes the first plurality of disk drives off-line from read and write operations directed to the RAID storage volume upon completion of the transfer.

* * * * *